Aug. 18, 1936.   K. E. McCONNAUGHAY   2,051,731
PROCESS FOR PREPARING PAVING MATERIAL
Filed June 17, 1932

Inventor
KENNETH E. McCONNAUGHAY,

By *Ashley Trask*
Attorneys

Patented Aug. 18, 1936

2,051,731

UNITED STATES PATENT OFFICE 2,051,731

PROCESS FOR PREPARING PAVING MATERIAL

Kenneth E. McConnaughay, Indianapolis, Ind., assignor to Pre Cote Corporation, Indianapolis, Ind., a corporation of Indiana Application June 17, 1932, Serial No. 617,725

4 Claims. (Cl. 94—43)

This application is concerned with improvements in the apparatus and process of producing bituminous paving materials disclosed in my prior United States Patent No. 1,975,902 which was granted October 9, 1934.

In my prior application referred to, aggregate is immersed in liquefied bitumen, usually asphalt; and after being immersed is removed from the bitumen bath, and excess bitumen is permitted to drain from it. While this process has proven generally satisfactory with clean, dry, aggregate of a type to which asphalt will readily adhere, I find that with wet aggregates, with aggregates including a considerable proportion of extremely fine material, and with aggregates of a type to which asphalt does not readily adhere a better paving material is produced if the aggregate is subjected to a preliminary treatment before it is immersed in the bath of liquefied bitumen. This application is primarily concerned with apparatus suitable for administering such a preliminary treatment of aggregate and with such preliminary treatment.

Figure 1:
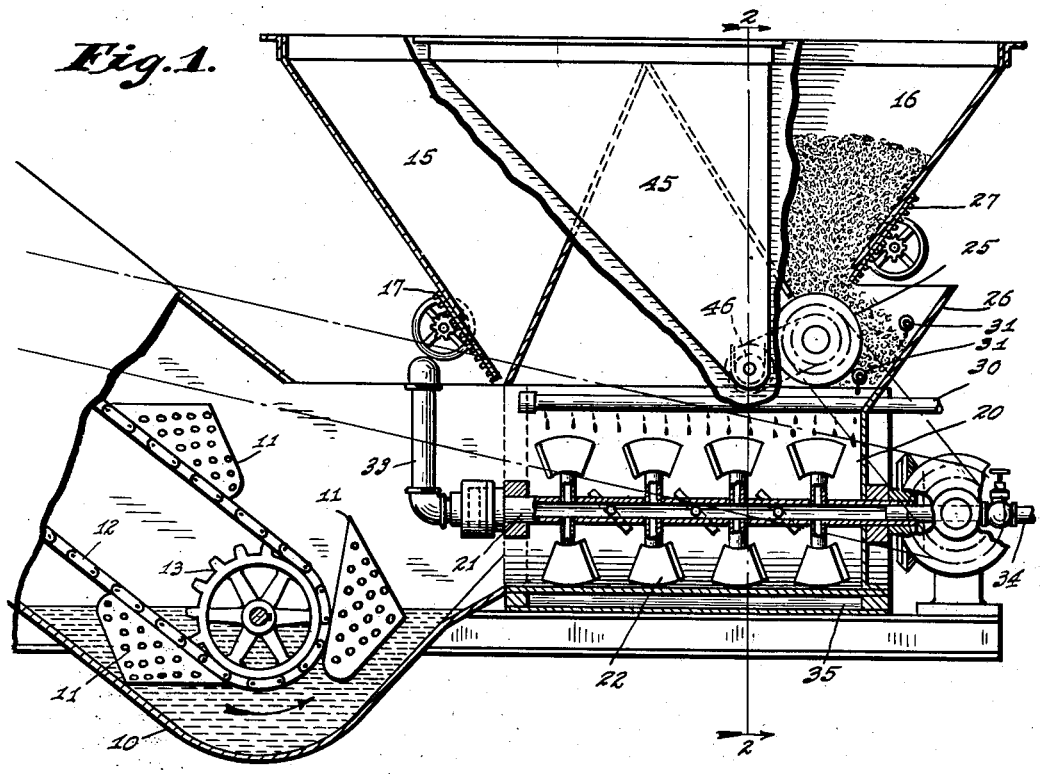
Figure 2:
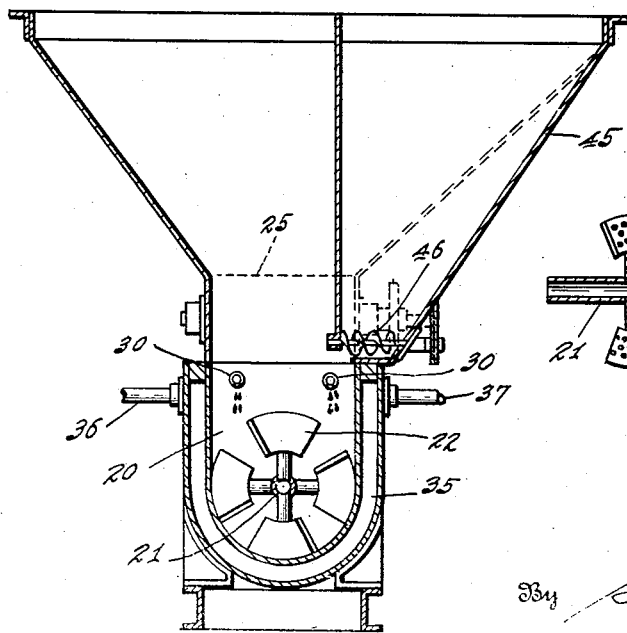
Figure 3:
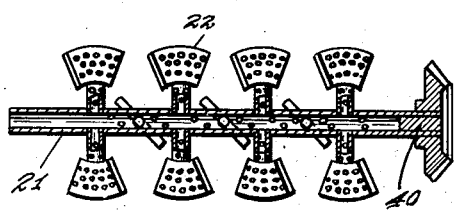

The accompanying drawing illustrates an apparatus suitable for use in practicing my invention: Fig. 1 is a side elevation of the vat containing the bitumen-bath and, in association therewith, the apparatus I employ in administering the preliminary treatment of the aggregate, parts of the machine being broken away to illustrate more clearly the interior construction; Fig. 2 is a vertical transverse section on the line 2—2 of Fig. 1; and Fig. 3 is a side elevation partly in section, showing a modified form of mixer which may be used in carrying out the preliminary treatment.

The device illustrated in the drawing embodies a vat 10 adapted to contain a supply of liquefied bitumen, preferably an asphalt-water emulsion. Dipping into the bitumen in the vat 10 is the lower end of a conveyor comprising a series of perforated buckets 11 mounted on an endless chain 12, the chain 12 passing over a sprocket 13 disposed within the vat 10. Preferably, the bottom of the vat is shaped so that it closely conforms to the path of the outer edge of the buckets 11 so that the buckets will keep the vat substantially free from solid matter.

Mounted adjacent the vat 10 I provide an aggregate hopper which may have two compartments 15 and 16. The former compartment may be arranged to discharge aggregate directly into the vat 10, the rate of discharge being controlled by a sliding gate 17. If the compartment 15 is so used, the apparatus is adapted to perform the process set forth in my prior application above referred to.

In carrying out the invention of the present application, however, I employ the other hopper-compartment 16, which is arranged so that aggregate may be fed from it into the outer end of a trough 20, the inner end of which discharges into the vat 10. For the purpose of causing aggregate to move along the trough 20 and to be discharged into the vat 10, I may employ a rotatable shaft 21 carrying a series of helically disposed blades 22 which, as the shaft is rotated, feed the aggregate along the trough toward and into the vat 10.

For the purpose of feeding aggregate into the trough 20, I may mount in the bottom of the hopper-compartment 16 a feed-roll 25, the upper surface of which is in contact with aggregate in the hopper 16. In the operation of the device, the feed-roll 25 is rotated so that its upper surface moves toward a chute 26 leading downwardly into the trough 20. A sliding gate 27, movable toward and away from the surface of the roll 25 may be employed to regulate the rate at which aggregate is fed into the trough 20.

The present invention contemplates treating the aggregate with liquid treating agents prior to its immersion in the vat 10; and for this purpose, spray-bars 30 may be employed. Conveniently, these spray bars extend longitudinally of the trough above the rotating blades 22 and discharge downwardly on to the aggregate passing along the trough. In addition to the longitudinally extending spray bars 30, I may employ, if desired, transverse spray bars 31 located in the chute 26.

If the liquid treating agent discharged on to the aggregate through the spray-bars 30 and 31 is of a bituminous nature, as it will be in most cases, it may be necessary, or at least advisable, to heat the blades 22 in order to prevent the adhesion of bitumen to them and the collection on them of the mixture of aggregate and bitumen. To this end, the shaft 21 and blades 22 may be made hollow, and the ends of the shaft connected respectively with steam-discharge and steam-supply pipes 33 and 34. In addition, the trough 20 may be provided with a steam jacket 35 connected to steam-supply and steam-discharge pipes 36 and 37.

In certain circumstances, it may be desirable to discharge a liquid treating agent on to the aggregate through the blades 22 rather than through spray-bars 30 and 31. If this is desired, the outer end of the hollow shaft 21 may be closed, as by means of a plug 40 illustrated in Fig. 3, and the blades 22 and shaft 21 provided with a multiplicity of holes. In such an arrangement, the liquid treating agent will be supplied through the supply pipe 33, will pass through the hollow shaft 21 and will be discharged through the openings in that shaft and in the blades 22.

If it is desired, as it may be in certain instances, to introduce into the trough 20 to be mixed with the aggregate a solid treating agent as well as a liquid treating agent, such result may be obtained through the use of a supplementary hopper 45 which is adapted to contain the solid material and which has mounted on or near its bottom a feed screw 46 discharging into the trough 20, as is clear from Fig. 2. The shaft 21, roll 25, and screw 45 are conveniently interconnected to rotate jointly.

With the apparatus above described, various types of treatment may be employed depending upon the type of aggregate, the type of bitumen, and the type of finished material which it is desired to produce. There are set forth below descriptions of several different modes of treatment in conjunction with which the apparatus above described may be used.

Where the aggregate employed in a process includes a considerable amount of dust or other fine material, the direct immersion method of my prior application above referred to is attended with certain difficulties, as the fine material has a tendency to segregate. To overcome this, the apparatus above described may be used, a bituminous emulsion, or some other form of liquefied bitumen being introduced either through the spray-bars 30 and 31 or through the perforated blades 22. The action of the blades as they move the aggregate along the trough 20 thoroughly agitates the aggregate and provides an even distribution of fine and coarse aggregate particles, the extremely fine particles being generally absorbed in the bitumen coating on the larger particles. Any film of dust or dirt adhering to the large aggregate particles in their original state is knocked off by the blades 22 and the bitumen is brought into direct contact with the surfaces of all particles.

With certain kinds of aggregate, especially smooth-surfaced, hard aggregate, it has been noted that asphalt does not adhere readily to the surface of the aggregate particles. It has also been noted that tar or tar emulsions or emulsions containing certain tar-distillates will readily adhere to the surface of aggregate particles of a type to which asphalt will not readily adhere. Through the use of the apparatus described in this application, the aggregate may be first subjected to treatment with tar or an emulsion of tar or suitable tar-distillates prior to its immersion in the vat 10. When such a treatment of the aggregate is indicated, tar or tar emulsion is introduced through the spray-bars 30 and 31 or through the hollow shaft and perforated blades. A suitable tar emulsion may be one containing from 60% to 80% tar, 20% to 40% water, and a small proportion of a suitable emulsifying agent. By the action of the blades 22 this tar is distributed over the surfaces of all aggregate particles, adheres thereto, and provides an effective bond between the aggregate and the bitumen coating which is applied in the vat 10. Depending upon the size of the aggregate particles, 1% to 3% of the tar emulsion, based on the weight of the aggregate, may be employed. This process has the same advantages as that set forth in the preceding example in respect to breaking up masses of fine aggregate particles and removing dust-coatings on the larger particles.

If the aggregate to be employed in producing the paving composition contains a large amount of dust and is also damp, the dust will be bound by the moisture to the surfaces of the larger aggregate particles and will prevent contact of the bitumen in the vat 10 with the aggregate particles. When such an aggregate is to be used, therefore, I may introduce into the trough 20 a rather heavy emulsion of asphalt, say an emulsion comprising 65% to 75% of asphalt, 70 to 150 penetration, 25% to 35% water, and a small proportion of a suitable emulsifying agent. Because of its comparatively high asphalt-content such an emulsion would not be unduly thinned by the water in the aggregate and would combine such water and the dust in a film on each larger particle of aggregate.

The simple immersion process has proven to present some slight difficulties when it is used to treat large-particle aggregate, as it has been difficult to build up a sufficiently heavy bitumen film on the surface of the large-aggregate particles. When treating such aggregate with the device of this application, there may be introduced into the trough 20 a bituminous emulsion thickened by the addition of lime-stone or other stone dust. Or, instead of adding the lime dust or other filter to the emulsion and introducing it into the trough suspended in the emulsion, an emulsion without the filler may be used and the filler added to the mixture through the use of the auxiliary hopper 45 and feed-screw 46. In the latter method, the feed screw 46 is arranged to discharge at a point intermediate the length of the trough 20 so that the bitumen and aggregate will have had an opportunity to become intermixed before the sand or other fine material is brought into contact with them.

Some aggregates are composed of particles having extremely slick outer surfaces to which a comparatively thick, soft, and sticky emulsion will adhere satisfactorily, but to which an emulsion of the type usually used in paving compositions will not adhere. In such a case, I may introduce into the trough 20 an emulsion comprising approximately 65% to 75% soft asphalt, say 150 to 350 penetration, 25% to 35% of water, and a suitable emulsifying agent. About 1% to 3%, based on the weight of the aggregate, of such an emulsion may be employed in the trough. It is distributed over the aggregate particles by the time they are discharged in the bath in the vat 10.

When it is desired to produce a paving composition adapted to be stored for a period of several months before use, I may treat the aggregate in the trough 20 with a comparatively thick emulsion comprising 65% to 75% of hard asphalt, say asphalt of a penetration from 50 to 80, 25% to 35% of water, and a suitable emulsifying agent. The amount of emulsion used should be from 1% to 4% based on the weight of the aggregate, and following treatment of this emulsion the coated aggregate may be immersed in an emulsion of a road oil or fluxing oil. The light emulsion will produce a thin film over the coated aggregate and during the time the material is stored will flux with the harder inner coating to produce an ultimate asphalt film having the desired qualities.

If, for any reason, it is impracticable to employ in the process just set forth an asphalt emulsion made by directly emulsifying the relatively hard asphalt, an emulsion of softer asphalt may be added to the aggregate through the spray-bars or the hollow blades and the effective hardness of the total asphalt applied in the trough may be increased to the desired point by feeding powdered, extremely hard asphalt into the trough 20 through the use of the auxiliary bin 45 and feed-screw 46.

In general, the character of the bath in the vat 10 will be such as to supplement the preliminary treatment given the aggregate in the trough 20. That is, the desirable characteristics and the proportion of the bitumen binder in the finished paving composition is well known, and the bitumen bath in the vat 10 should be of such a consistency and bitumen content as when mixed with the aggregate discharged from the trough it will produce a finished product meeting the required specifications. For example, if the aggregate is treated in the trough with a bitumen harder than that specified for the final composition, the bitumen in the vat 10 will be softer than that specified in order that the mixture of the two bitumens will have the required properties. If the aggregate is treated in the trough with an emulsion rich in bitumen, and if that emulsion is not unduly diluted by moisture in the aggregate, the emulsion in the vat 10 will have a comparatively low bitumen content in order that the final bitumen film resulting from the blending of the separately applied emulsion will meet the desired specifications. Further, the immersion of the treated aggregate in the bath in the vat 10 and its subsequent removal smooths out and evens the bitumen coatings applied to the aggregate in the trough 20.

It is not at all essential in all instances that the bituminous treating agent applied to the aggregate in the trough be different in character from that employed in the vat 10. Thus, if the aggregate does not require preliminary treatment with a particular kind of bitumen or with a bituminous emulsion of a particular bitumen-content, but merely requires preliminary agitation such as might be required to prevent segregation of aggregate particles or to remove dust-coatings on the larger particles, an excess amount of liquefied bitumen might be supplied to the aggregate in the trough; such excess draining into the vat 10 and providing the bath therein.

I claim as my invention:

1. A process of producing a paving composition comprising a mixture of aggregate and a bituminous binder in predetermined proportions; comprising agitating the aggregate while mixing it with a bituminous liquid containing less bitumen than the finished paving composition is to contain, immersing the aggregate in a bath of liquefied bitumen of different characteristics from the first named bituminous liquid, elevating the aggregate from the bath, permitting excess bitumen to drain from it, and regulating the characteristics of the liquefied bitumen in the bath so that such predetermined proportion of bituminous binder is left upon the aggregate after excess bitumen has drained from it.

2. A process of producing a paving composition comprising a mixture of aggregate and a bituminous binder in predetermined proportions; comprising agitating the aggregate while mixing it with a bituminous liquid containing less bitumen than the finished paving composition is to contain, immersing the aggregate in a bath of liquefied bitumen, elevating the aggregate from the bath, permitting excess bitumen to drain from it, and regulating the characteristics of the liquefied bitumen in the bath so that such predetermined proportion of bituminous binder is left upon the aggregate after excess bitumen has drained from it.

3. A process of producing a paving composition comprising a mixture of aggregate and a bituminous binder in predetermined proportions; comprising agitating the aggregate while mixing it with a bituminous liquid containing less bitumen than the finished paving composition is to contain, thereafter treating the aggregate with an excess of a second liquefied bitumen of different characteristics, then permitting excess bitumen to drain from the aggregate, and regulating the characteristics of said second liquefied bitumen so that such predetermined proportion of bituminous binder is left on the aggregate after the excess bitumen has drained from it.

4. A process of producing a paving composition comprising a mixture of aggregate and a bituminous binder in predetermined proportions; comprising agitating the aggregate while mixing it with a bituminous liquid containing less bitumen than the finished paving composition is to contain, thereafter treating the aggregate with an excess of a second liquefied bitumen, then permitting excess bitumen to drain from the aggregate, and regulating the characteristics of said second liquefied bitumen so that such predetermined proportion of bituminous binder is left on the aggregate after the excess bitumen has drained from it.

KENNETH E. McCONNAUGHAY.